United States Patent
Teraguchi et al.

(10) Patent No.: US 11,938,958 B2
(45) Date of Patent: Mar. 26, 2024

(54) VOICE DIALOGUE DEVICE, VOICE DIALOGUE SYSTEM, AND CONTROL METHOD FOR VOICE DIALOGUE SYSTEM

(71) Applicant: Nissan Motor Co., Ltd., Kanagawa (JP)

(72) Inventors: Takehito Teraguchi, Kanagawa (JP); Hirofumi Inoue, Kanagawa (JP); Jo Nishiyama, Kanagawa (JP); Shota Okubo, Kanagawa (JP); Yu Shikoda, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 570 days.

(21) Appl. No.: 17/266,401

(22) PCT Filed: Aug. 6, 2018

(86) PCT No.: PCT/JP2018/029470
§ 371 (c)(1),
(2) Date: Feb. 5, 2021

(87) PCT Pub. No.: WO2020/031241
PCT Pub. Date: Feb. 13, 2020

(65) Prior Publication Data
US 2021/0309241 A1 Oct. 7, 2021

(51) Int. Cl.
*B60W 50/10* (2012.01)
*B60R 16/037* (2006.01)
(Continued)

(52) U.S. Cl.
CPC ......... *B60W 50/10* (2013.01); *B60R 16/0373* (2013.01); *B60W 50/14* (2013.01);
(Continued)

(58) Field of Classification Search
CPC .. B60W 50/10; B60W 50/14; B60W 2420/54; B60W 2520/10; B60W 2540/21;
(Continued)

(56) References Cited

U.S. PATENT DOCUMENTS

| 2007/0094033 A1* | 4/2007 | Nagashima | G10L 15/22 704/E15.04 |
| 2008/0235017 A1* | 9/2008 | Satomura | G10L 15/22 704/E15.04 |

(Continued)

FOREIGN PATENT DOCUMENTS

| JP | H10-104009 A | 4/1998 |
| JP | 2003108191 A | 4/2003 |
| JP | 2006138994 A | 6/2006 |
| JP | 2009168773 A | 7/2009 |
| JP | 2012024481 A | 2/2012 |
| JP | 2015068866 A | 4/2015 |
| JP | 2017067849 A | 4/2017 |

(Continued)

OTHER PUBLICATIONS

Takahashi, et al., "Human interface in ITS", Japan Automobile Research Institute, Japanese Industrial Publishing Co., Ltd., vol. 17, pp. 37-41 (13 pages).

*Primary Examiner* — Jonathan M Dager
*Assistant Examiner* — Jean W Charleston
(74) *Attorney, Agent, or Firm* — Osha Bergman Watanabe & Burton LLP (57) ABSTRACT

The present disclosure including determining that a state of a load on an occupant in a vehicle on the basis of at least one of a traveling state of the vehicle (100), an external environment state of the vehicle, and a state of the occupant in the vehicle, and executing a dialogue with the occupant by executing a dialogue program corresponding to the state of the load on the occupant.

12 Claims, 8 Drawing Sheets

(51) Int. Cl.
  *B60W 50/14* (2020.01)
  *G10L 15/22* (2006.01)
(52) U.S. Cl.
  CPC .......... *G10L 15/22* (2013.01); *B60W 2420/54* (2013.01); *B60W 2520/10* (2013.01); *B60W 2540/21* (2020.02); *B60W 2540/22* (2013.01); *B60W 2552/05* (2020.02); *B60W 2552/30* (2020.02); *B60W 2554/406* (2020.02); *B60W 2556/45* (2020.02); *G10L 2015/227* (2013.01); *G10L 2015/228* (2013.01)
(58) Field of Classification Search
  CPC ......... B60W 2540/22; B60W 2552/05; B60W 2552/30; B60W 2554/406; B60W 2556/45; B60R 16/0373; G10L 15/22; G10L 2015/227; G10L 2015/228
  USPC ......................................................... 701/23
  See application file for complete search history.

(56) References Cited

U.S. PATENT DOCUMENTS

| | | | |
|---|---|---|---|
| 2011/0193726 A1* | 8/2011 | Szwabowski | B60R 16/0373 340/425.5 |
| 2015/0095037 A1 | 4/2015 | Shimizu et al. | |
| 2016/0236690 A1* | 8/2016 | Juneja | G10L 13/04 |
| 2016/0336009 A1 | 11/2016 | Takei et al. | |
| 2017/0162197 A1 | 6/2017 | Cohen | |
| 2017/0249941 A1* | 8/2017 | Moegele | B60R 16/0373 |
| 2017/0323639 A1* | 11/2017 | Tzirkel-Hancock | H04R 5/023 |
| 2018/0204570 A1* | 7/2018 | Puranik | G10L 15/24 |
| 2018/0204572 A1* | 7/2018 | Manabe | G10L 13/00 |
| 2018/0270344 A1* | 9/2018 | Kawagishi | G07C 5/008 |
| 2019/0332915 A1* | 10/2019 | Devdutt | G06F 3/167 |

FOREIGN PATENT DOCUMENTS

| | | |
|---|---|---|
| WO | 2015128960 A1 | 9/2015 |
| WO | 2016147367 A1 | 9/2016 |

* cited by examiner

| Item | | |
|---|---|---|
| Traveling state | Large driving load | Small driving load |
| Driving subject | Traveling | Stopping |
| Driving operation | Driver | Vehicle controller |
| | Parking in a garage | - |
| | Parallel parking | - |
| | Backward parking | - |
| External environment | Highway | Congested road (including Highway) |
| | Intersection | Straight road |
| | Few obstacles in surroundings | Many obstacles in surroundings |

FIG. 3

| Output / Recognition | First dialogue mode | Second dialogue mode |
|---|---|---|
| Voice output | Limit on the number of words occupant speaks<br>(Ex. 1) Question answerable by "Yes" or "No"<br>(Ex. 2) Question answerable by a number attached to multiple possible answers | No limit on the number of words occupant speaks |
| | Limit on the number of words output<br>(Ex. 1) Providing no information other than questions<br>(Ex. 2) Question with simple expressions | No limit on the number of words output |
| Voice recognition | Sentence recognition<br>(Features) Large number of words required for recognition<br>Grammar check<br>Relatively long processing time<br>(Ex.) Sentence-recognition, Speech to text | |

| Controller | : Your destination is Tokyo Tower, right? |
| Occupant | : Yes. |
| Controller | : Our destination is set to Tokyo Tower. |

(B)

| Controller | : It's hot indoors, would you like me to lower the temperature setting on the air conditioner? |
| Occupant | : No, thanks. |
| Controller | : Copy that. The temperature setting of the air conditioner remains the same. |

FIG. 6

| Occupant | : | I'm hungry. |
| Controller | : | There are five restaurants near here. What would you like to eat? |
| Occupant | : | I'd like to eat Chinese food. It's better to be as close as possible. |
| Controller | : | Restaurant "A" is only five minutes from our current location. It seems that there are seats available. |
| Occupant | : | Then let's go there. |

FIG. 7

| Output / Recognition | First dialogue mode | Second dialogue mode |
|---|---|---|
| Voice output | No limit on the number of words occupant speaks | |
| | No limit on the number of words output | |
| Voice recognition | Discrete word recognition<br>(Features) Small number of words required for recognition<br>Relatively high recognition accuracy<br>Relatively short processing time<br>(Ex.) Keyword Spotting | Sentence recognition<br>(Features) Large number of words required for recognition<br>Grammar check<br>Relatively long processing time<br>(Ex.) Sentence-recognition. Speech to text |

FIG. 8

| Output / Recognition | First dialogue mode | Second dialogue mode |
|---|---|---|
| Voice output | Limit on the number of words occupant speaks<br>(Ex. 1) Question answerable by "Yes" or "No"<br>(Ex. 2) Question answerable by a number attached to multiple possible answers | No limit on the number of words occupant speaks |
| | Limit on the number of words output<br>(Ex. 1) Providing no information other than questions<br>(Ex. 2) Question with simple expressions | No limit on the number of words output |
| Voice recognition | Discrete word recognition<br>(Features) Small number of words required for recognition<br>Relatively high recognition accuracy<br>Relatively short processing time<br>(Ex.) Keyword Spotting | Sentence recognition<br>(Features) Large number of words required for recognition<br>Grammar check<br>Relatively long processing time<br>(Ex.) Sentence-recognition, Speech to text |
| Topic | All matters related to traveling<br>(Ex.) Steering control, Traveling control, Destination setting | No limit<br>(Ex.) All matters related to traveling, Weather, Entertainment |

VOICE DIALOGUE DEVICE, VOICE DIALOGUE SYSTEM, AND CONTROL METHOD FOR VOICE DIALOGUE SYSTEM

TECHNICAL FIELD

The present invention relates to a voice dialogue device, a voice dialogue system, and a method for controlling a voice dialogue device.

BACKGROUND ART

A dialogue device mounted on a vehicle together with a voice output device for outputting voice in a vehicle interior and capable of interacting with a driver of the vehicle is known (Patent Document 1). The dialogue device comprises a dialogue execution unit, a load determination unit, and a speech control unit. The dialogue execution unit generates a conversation sentence directed to the driver and causes the conversation sentence to be spoken by the voice output device. The load determination unit determines whether or not the driving load on the driver is high for the road on which the vehicle is traveling. The speech control unit sets a prohibition state in which the start of speech by the dialogue execution unit is prohibited when the load determination unit determines that the driving load is high and sets a permission state in which the start of speech by the dialogue execution unit is permitted when the load determination unit determines that the driving load is low.

PRIOR ART DOCUMENT

Patent Document

[Patent Document 1] JP 2017-67849 A

SUMMARY OF INVENTION

Problems to be Solved by Invention

In the prior art, there is a problem that the dialogue with the occupant cannot be continued when it is determined that the load on the occupant is high such as the driving operation.

The problem to be solved by the present invention is to provide a voice dialogue device, a voice dialogue system, and a method for controlling the voice dialogue device, which are capable of continuing a dialogue with the occupant regardless of a state of a load on the occupant.

Means for Solving Problems

The present invention solves the above-mentioned problem by determining the state of a load on an occupant on the basis of a state of at least one of a traveling state of a vehicle, a state of an external environment of the vehicle, and a state of the occupant in the vehicle, and executing a dialogue with the occupant by executing a dialogue program corresponding to the state of the load.

Effect of Invention

According to the present invention, the dialogue with the occupant can be continued regardless of the state of the load on the occupant.

MODES(S) FOR CARRYING OUT THE INVENTION

Hereinafter, embodiments of the present invention will be described with reference to the drawings.

First Embodiment

Figure 1:
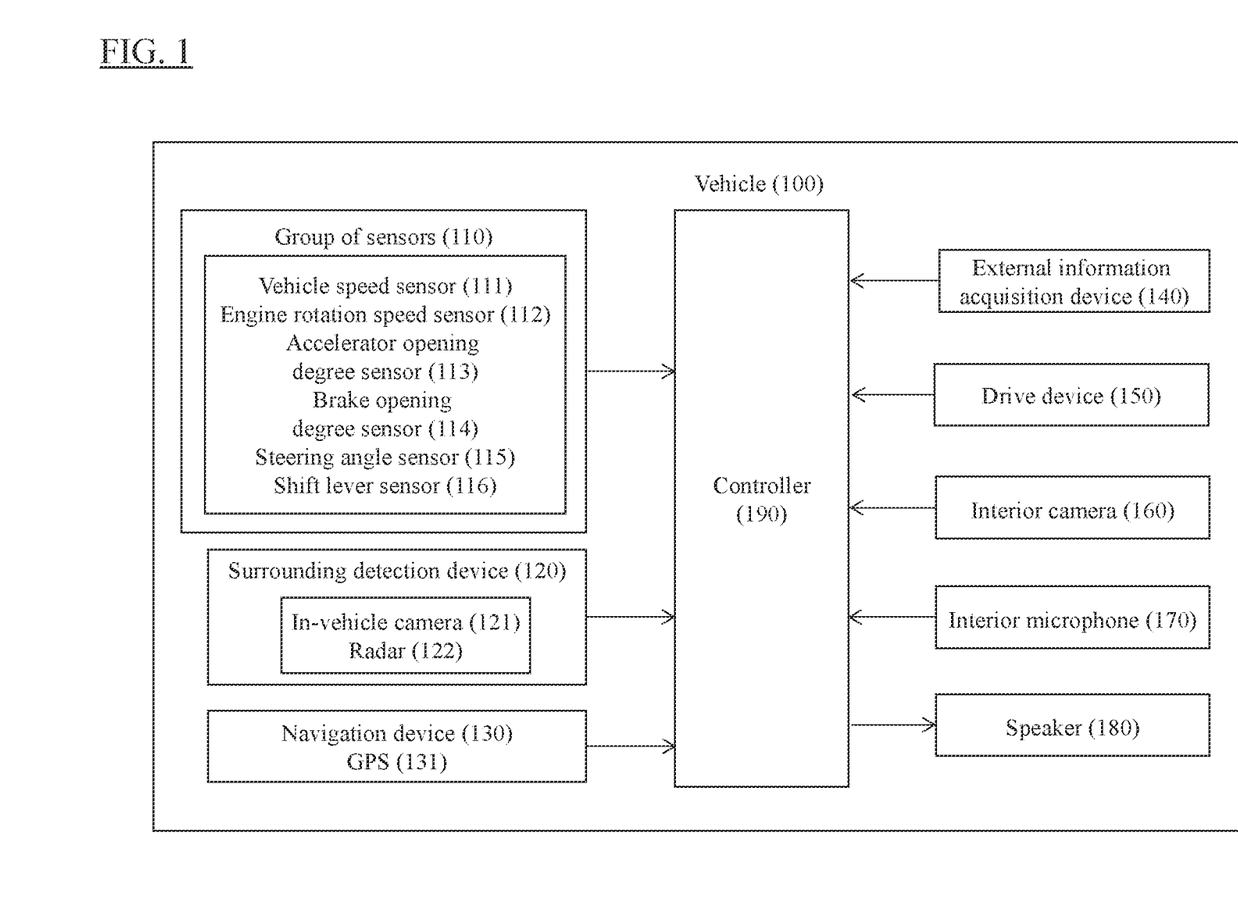
FIG. 1 is a block diagram of a voice dialogue system according to the present embodiment.

FIG. 1 is a diagram showing a configuration of a voice dialogue system according to the present embodiment. As shown in FIG. 1, in the present embodiment, a configuration in which the voice dialogue system is equipped in a vehicle 100 will be described as an example.

The vehicle 100 comprises a group of sensors 110, a surrounding detection device 120, a navigation device 130, an external information acquisition device 140, a drive device 150, an interior camera 160, an interior microphone 170, a speaker 180, and a controller 190. These devices are connected to one another via a controller area network (CAN) or other in-vehicle LAN for mutually exchanging information. The voice dialogue device according to the present embodiment includes the controller 190.

As the vehicle 100 of the present embodiment, an electric vehicle comprising an electric motor as a driving source, an engine vehicle comprising an internal combustion engine as a driving source, a hybrid vehicle comprising both an electric motor and an internal combustion engine as a driving source can be exemplified. The electric cars and hybrid cars equipped with electric motors as the driving sources include those in which secondary batteries are used as power sources for the electric motors and those in which fuel cells are used as power sources for the electric motors.

The group of sensors 110 is composed of a device that detects traveling states of the vehicle. Specifically, the group of sensors 110 of the present embodiment is composed of a vehicle speed sensor 111, an engine rotation speed sensor 112, an accelerator opening degree sensor 113, a brake opening degree sensor 114, a steering angle sensor 115, and a shift lever sensor 116.

The vehicle speed sensor 111 measures the rotational speed of the drive system, such as the drive shaft, and detects the traveling speed of the vehicle (hereinafter, also referred to as vehicle speed) based on this. The vehicle speed sensor 111 outputs the vehicle speed data to the controller 190. In the present embodiment, the vehicle 100 may be configured to include an acceleration sensor instead of or in addition to the vehicle speed sensor 111.

The engine rotation speed sensor 112 detects the engine RPM and outputs the engine RPM data to the controller 190. The accelerator opening degree sensor 113 detects an accelerator pedal manipulated variable and outputs the information on the accelerator pedal manipulated variable to the controller 190. The brake opening degree sensor 114 detects a brake pedal manipulated variable and outputs the information on the brake pedal manipulated variable to the controller 190. The steering angle sensor 115 detects a steering angle of the steering and outputs the information on the steering angle of the steering to the controller 190. The shift lever sensor 116 detects a position of the shift lever sensor (shift lever position) and outputs the position information of the shift lever sensor to the controller 190.

The surrounding detection device 120 detects an object existing in the surrounding area of the vehicle 100. Examples of the surrounding detection device 120 include an in-vehicle camera 121 and a radar 122. The in-vehicle camera 121 images the surrounding area of the vehicle 100. The in-vehicle camera 121 is composed of, for example, a front camera for imaging the front of the vehicle 100, a rear camera for imaging the rear of the vehicle 100, a side camera for imaging the side of the vehicle 100. The radar 122 detects an obstacle existing in the surrounding area of the vehicle 100. The radar 122 is composed of, for example, a front radar that detects an obstacle existing in front of the vehicle 100, a rear radar that detects an obstacle existing in the rear of the vehicle 100, and a side radar that detects an obstacle existing in the side of the vehicle 100. The radar 122 detects the distance from the vehicle 100 to the obstacle and the direction in which the obstacle is located.

Objects detected by the surrounding detection device 120 include pedestrians, bicycles, motorcycles, vehicles, road obstacles, traffic lights, road markings, and pedestrian crossings. Incidentally, the surrounding detection device 120 may be configured to use any one of the above-mentioned in-vehicle camera 121 and radar 122, or a combination of two or more types. The surrounding detection device 120 outputs the imaged information and the detection results to the controller 190 as surrounding information.

The navigation device 130 guides a driver by indicating the route from the current location of the vehicle 100 to the destination based on the location information of the vehicle 100 detected by GPS131. The navigation device 130 has map information and calculates the traveling route of the vehicle 100 based on the location information of the vehicle 100 and the location information of the destination. The navigation device 130 outputs the location information of the vehicle 100 and the information of the traveling route of the vehicle 100 to the controller 190. The travel route of the vehicle 100 includes a route in which the vehicle 100 has actually traveled and a route in which the vehicle 100 will travel in the future.

The external information acquisition device 140 is connected to networks existing outside the vehicle 100 and acquires information on the external environments of the vehicle 100. The external information acquisition device 140 includes a device that acquires various types of information from networks outside the vehicle at predetermined intervals via a communication line. For example, the external information acquisition device 140 acquires road congestion information, road construction information, and accident information from VICS (registered trademark) systems. For example, the external information acquisition device 140 acquires weather information from an external server. The external information acquisition device 140 outputs the information acquired from the outside of the vehicle 100 to the controller 190. The external information acquisition device 140 is not limited to acquiring information from an external server, but can search necessary information on networks and access a server that manages the information according to the search results.

Further, the external information acquisition device 140 is not limited to a device for acquiring information on the external environment via the communication line. For example, the external information acquisition device 140 may be an external temperature sensor for detecting the external temperature, a humidity sensor for detecting the humidity, or a raindrop sensor for detecting raindrops. The external temperature sensor outputs information on the external temperature as a detection result to the controller 190. The humidity sensor outputs humidity information as a detection result to the controller 190. The raindrop sensor outputs information on raindrops as a detection result to the controller 190.

The drive device 150 includes a drive mechanism for the vehicle 100. The drive mechanism includes an electric motor and/or an internal combustion engine is a traveling drive source of the vehicle 100 described above, a power transmission including a drive shaft and an automatic transmission for transmitting the output from these traveling drive source to the drive wheels, and a braking device for braking the wheels (not shown) and the like. The drive device 150 generates respective control signals of these drive mechanisms based on an input signal by the driver's accelerator operation and the brake operation, a control signal acquired from a vehicle controller (not shown) or the travel control device (not shown), and executes driving control including acceleration and deceleration of the vehicle. Command information may be sent to the drive device 150, which can thereby automatically perform the travel control including acceleration and deceleration of the vehicle. In the case of a hybrid car, a ratio of the torque output to the electric motor and the torque output to the internal-combustion engine in accordance with the traveling state of the vehicle is also transmitted to the drive device 150.

A subject who operates the vehicle 100 in this embodiment is a subject who controls the drive device 150, which is the driver of the vehicle 100 or the vehicle controller. The vehicle 100 is traveled by the driver's driving operation or by an automated driving operation by the vehicle controller. For example, although not illustrated in FIG. 1, the vehicle 100 is provided with a device (e.g., a button-shaped switch) for switching the subject of the driving operation. The driver can switch between a manual driving operation or the driving operation by the vehicle controller by switching this switch. The driving operation by the vehicle controller is so-called an automated driving operation, which is a driving operation that allows the vehicle to travel automatically. As the art of the automated driving, a technique known at the time of filing of the present application can be appropriately used. The drive device 150 outputs the information on the driving subject who is operating the vehicle 100 to the controller 190 as driving subject information.

The interior camera 160 is provided in a position capable of imaging the occupant in the vehicle 100 to image the occupant. In the present embodiment, the interior camera 160 images an image of the driver among the occupants in the vehicle 100. The interior camera 160 is preferably provided in a position capable of imaging the driver's facial expressions including the driver's gaze, and the driving operation by the driver. The interior camera 160 outputs the information on the captured image of the driver to the controller 190.

The interior microphone 170 acquires voice information from the occupant of the vehicle 100 and stores it at least temporarily. In the present embodiment, the interior microphone 170 acquires voice information of the driver among the occupants in the vehicle 100. The position of the interior microphone 170 is not particularly limited, but it is preferable to provide it near the occupant's seat.

The speaker 180 outputs voice information to the occupant in the vehicle 100. In the present embodiment, the speaker 180 outputs voice information to the driver among the occupants in the vehicle 100. The position of the speaker 180 is not particularly limited, but it is preferable to provide it near the occupant's seat.

Next, the controller 190 of the present embodiment will be described. The controller 190 is composed of a ROM (Read Only Memory) that stores a program for executing a dialogue process with the occupant utilizing a dialogue program corresponding to the load on the occupant in the vehicle 100, a CPU (Central Processing Unit) that executes the program stored in the ROM, and a RAM (Random Access Memory) that functions as an accessible storage device. A micro processing unit (MPU), a digital signal processor (DSP), an application specific integrated circuit (ASIC), a field programmable gate array (FPGA), or the like can be used as an operation circuit as substitute for or in addition to the CPU.

The controller 190 executes the program stored in the ROM, thereby realizing: a traveling state information acquisition function for acquiring information on the traveling state of the vehicle 100; an external information acquisition function for acquiring information on the external environment of the vehicle 100; a driving operation information acquisition function for acquiring information on the driving operation of the vehicle 100; a driving load determination function for determining the size of the driving load on the occupant in the vehicle 100 based on the acquired information; and a dialogue function for selecting a dialogue program corresponding to the size of the driving load and executing a dialogue with the driver. Each function of the controller 190 will be described below.

The controller 190 acquires information on the traveling state of the vehicle 100 by the traveling state information acquiring function. Information on the traveling state includes the vehicle speed of the vehicle 100, the engine rotation speed, the accelerator manipulated variable, the brake manipulated variable, and the steering angle of the steering. When the vehicle 100 includes a device such the navigation device 130 that operates by an application, the controller 190 inputs information on the type of the application running. In this case, the information on the traveling state includes information on the type of the application in addition to the above-mentioned information.

The controller 190 acquires information on the external environment of the vehicle 100 by the external information acquisition function. Information on the external environment includes the distance to obstacles around the vehicle 100 and the direction in which the obstacles are located, information about the road on which the vehicle 100 is traveling (including type information, congestion information, construction information, and accident information), and the current location of the vehicle 100.

The controller 190 acquires information on driving operation by the driving operation information acquisition function. Information on the driving operation includes the shift lever position, information on the driving subject of the vehicle 100, information on the driving posture of the driver. The information on the driving posture is information based on the captured images of the driver imaged by the interior camera 160. The controller 190 grasps the driving posture of the driver by performing image processing on the captured image of the driver.

The controller 190 determines the size of the driving load on the driver by the driving load determination function. The controller 190 according to the present embodiment determines whether the size of the driving load is larger or smaller than a predetermined standard on the basis of at least one of the information on the traveling state acquired by the traveling state information acquiring function, the information on the external environment acquired by the external environment information acquiring function, and the information on the driving operation acquired by the driving operation information acquisition function. In the present embodiment, the explanation is based on an example of a configuration in which the size of the driving load is divided into two categories: larger or smaller than the predetermined standard, but the method of determining the size of the driving load is not limited to this. For example, the size of the driving load may be divided into three or more categories. The determination of the size of the driving load here is that the controller 190 determines whether the state of the driving load is classified into two or more classifications on the basis of at least any one information among the information on the traveling state acquired by the traveling state information acquisition function, the information on the external environment acquired by the external environment information acquisition function, and the information on the driving operation acquired by the driving operation information acquisition function. In the present embodiment, two or more classifications means determining whether the state corresponds to a state with a large driving load or a state with a small driving operation load.

Here, the driving load means the load borne by the driver when the driver operates the vehicle 100. When the driving load is large, the driver is required to have a high concentration force for driving operation. For this reason, the driver consciously or unconsciously lowers the priority for operations other than driving operation. The operations other than driving operation include, for example, an operation for adjusting the temperature or air volume of the air conditioner, an operation for adjusting the volume of music or radio, or the like.

Figure 2:
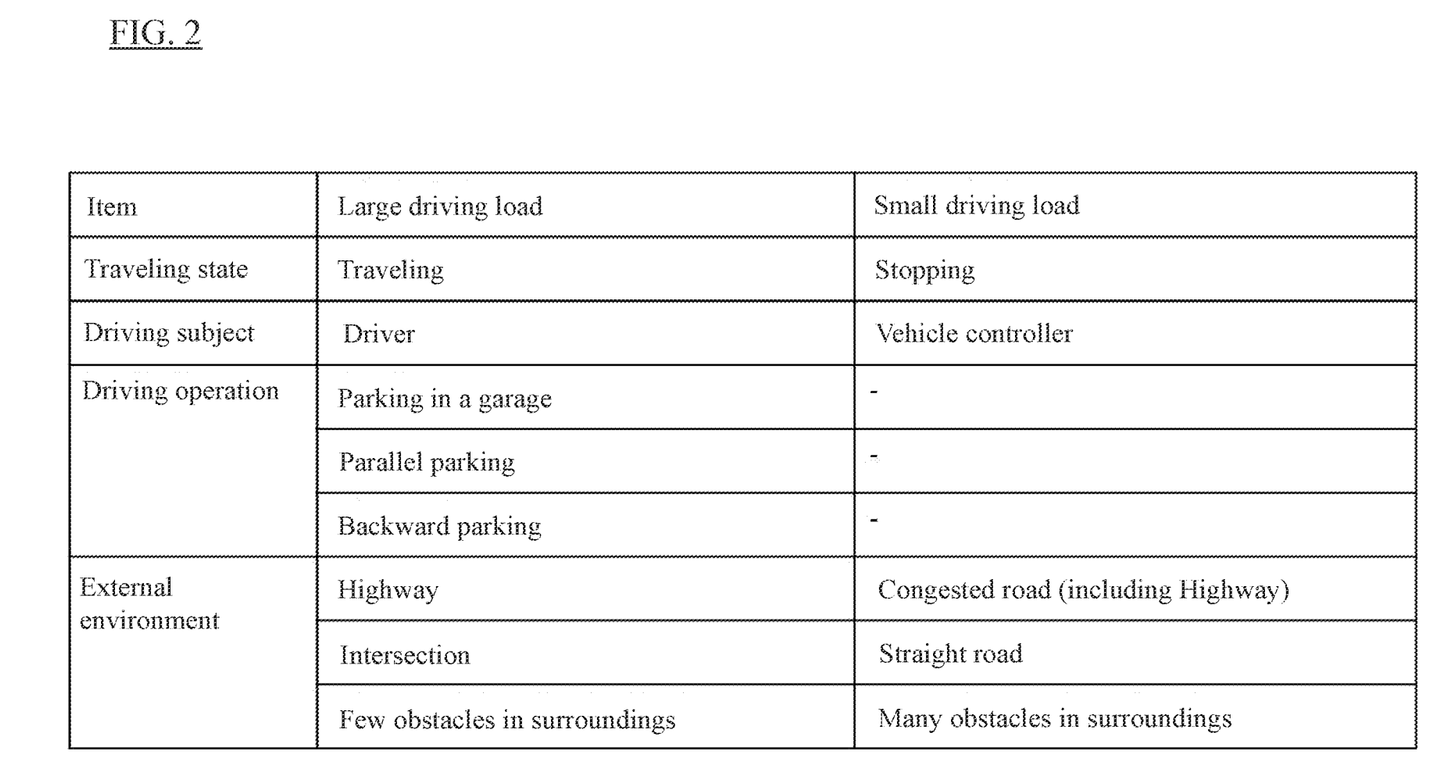
FIG. 2 is an example of items and determination standard for determining a size of a driving load.

Next, referring to FIG. 2, a specific method for determining the size of the driving load will be described. FIG. 2 is an example of items and determination standard for determining the size of the driving load.

As shown in FIG. 2, the controller 190 determines the size of the driving load according to the traveling state of the vehicle 100. The controller 190 determines that the driving load is large when the traveling state of the vehicle 100 corresponds to "Traveling". On the other hand, the controller 190 determines that the driving load is small when the traveling state of the vehicle 100 corresponds to "Stopping". For example, the controller 190 detects that the traveling state of the vehicle is in "Traveling" state when the shift lever position is in "D (Drive)". Further, for example, the controller 190 detects that the traveling state of the vehicle is in "Stopping" state when the shift lever position is in "P (Parking)" or "N (Neutral)". The determination method using the traveling state is not limited to the above-mentioned determination method. For example, the traveling state of the vehicle may be determined from the vehicle speed, the engine rotation speed, the accelerator pedal manipulated variable, the brake pedal manipulated variable.

Further, in FIG. 2, "Traveling" or "Stopping" is taken as an example as an item of the traveling state, but the items of the traveling state are not limited thereto. For example, the controller 190 may determine that the driving load is small when the vehicle speed is less than or equal to a predetermined speed, even if the vehicle is traveling. Further, for example, the controller 190 may determine that the vehicle is stopping before starting and that the driving load is large, when the shift lever position is in "D (Drive)" and the brake pedal manipulated variable greater or equal to a predetermined value, even if the vehicle is stopped.

Further, as shown in FIG. 2, the controller 190 determines the size of the driving load according to the driving subject of the vehicle 100. The controller 190 determines that the driving load is large when the driving subject of the vehicle 100 corresponds to "Driver". On the other hand, the controller 190 determines that the driving load is small when the driving subject of the vehicle 100 corresponds to "Vehicle controller". For example, the controller 190 detects whether the current driving subject is the driver or the vehicle controller by using the driving subject information acquired from the drive device 150. The determination method using the driving subject information is not limited to the above-mentioned determination method. For example, suppose that the controller 190 detects that the driver is not operating the steering wheel from the captured image of the driver imaged by the interior camera 160, even though the vehicle is traveling. In this case, the controller 190 may determine that the driving subject corresponds to "Vehicle controller" and that the driving load is small.

Further, as shown in FIG. 2, the controller 190 determines the size of the driving load according to the driving operation. The controller 190 determines that the driving load is large when the driving operation corresponds to any one of the operations of "Parking in a garage", "Parallel parking", and "Backward parking". For example, the controller 190 determines that the driving operation may correspond to "Parking" as a primary determination when detecting that the shift lever position in "R (Reverse)".

Then, when detecting that the vehicle 100 is in the area surrounding a garage from the surrounding information of the vehicle 100, the controller 190 determines that the driving operation corresponds to "Parking in a garage". Further, the controller 190 determines that the driving operation corresponds to "Parallel parking" when another vehicle or a parking space for parallel parking is detected from the surrounding information of the vehicle 100. The controller 190 determines that the driving operation corresponds to "Backward parking" when detecting that the vehicle 100 is parked backward from the steering angle and the brake pedal manipulated variable. The determination methods using the driving operation are just examples and are not particularly limited. For example, the controller 190 may estimate the traveling trajectory of the vehicle 100 based on the steering angle, vehicle speed, the brake pedal manipulated variable, and the accelerator pedal manipulated variable, and determines whether the driving operation corresponds to any one of the operations of "Parking in a garage", "Parallel parking", and "Backward parking".

Further, as shown in FIG. 2, the controller 190 determines that the size of the driving load according to the external environment of the vehicle 100. The external environment includes a traveling location, a traffic condition, weather, a time zone, a large number of obstacles existing in the surrounding area, and a distance to the obstacles, or the like. The controller 190 determines that the driving load is large when the traveling location of the vehicle 100 corresponds to "Highway". On the other hand, the controller 190 determines that the traveling operation load is small when the traveling location of the vehicle 100 corresponds to "Congested road". For example, the controller 190 detects that the traveling location of the vehicle 100 corresponds to "Highway" when the current location of the vehicle 100 is a highway and that there is no information on traffic congestion in the surrounding area of the current location. Further, the controller 190 detects that the traveling location of the vehicle 100 corresponds to "Congested road" when there is information on traffic congestion in the surrounding area of the current location.

Further, the controller 190 determines that the driving load is large when the traveling location of the vehicle 100 corresponds to the "Intersection". On the other hand, the controller 190 determines that the driving load is small when the traveling location of the vehicle 100 corresponds to "Straight road". Further, the controller 190 determines that driving load is large when the number of obstacles (other vehicle, two-wheel vehicle, pedestrian, etc.) in the surrounding area of the vehicle 100 is less than a predetermined number. On the other hand, the controller 190 determines that the driving load is small when the number of obstacles is equal to or greater than the predetermined number.

The determination standards above-mentioned are just examples and are not particularly limited. The controller 190 can include the type of the application running in the interior of the vehicle 100 as an item of the traveling state of the vehicle 100. In this case, the controller 190 determines the size of the driving load according to the type of application running. The type of the application is not particularly limited. The determination of the size of the driving load based on the type of the application should preferably be performed according to experimentally determined standard.

An example of a method for determining the size of the driving load for each of the items shown in FIG. 2 has been described so far, but the size of the driving load does not need to be determined from one item, and the size of the driving load may be determined for at least any one of a plurality items.

For example, if the controller 190 determines the size of the driving load for a plurality of items, the controller 190 uses a predetermined method to determine the size of the driving load. For example, the controller 190 may determine the size of the driving load by weighting the determination results for each item with a weighting that is set for each item in advance. In addition, the controller 190 may determine the size of the driving load by taking a majority vote on the determination results for each item.

The determination items may be different depending on the driver's driving skill level. For example, the controller 190 estimates the driving skill level from information on the driver registered in advance. Then, the controller 190 does not make any determination about "Traveling state" item shown in FIG. 2 when the driver's driving skill level is higher than a predetermined value. This is based on the viewpoint that since the driver with high driving skill level is a driver who is accustomed to a drive or a driver who likes a drive, in determining the driving load on such a driver, it is difficult to determine the size of the driving load only by determining whether the vehicle is traveling or stopping. Conversely, in the case of a driver with a low driving skill level (e.g., inexperienced driver, etc.), since just doing the driving results in a large driving load, the controller 190 determines the driving load for the "Traveling state" item when a driver with a driving skill level less than the predetermined value is driving. The predetermined value is not particularly limited, and a value experimentally obtained is preferable.

Next, the dialogue function will be described. The controller 190 executes a dialogue with the occupant in the vehicle 100 by executing a dialogue program corresponding to the size of the driving load by the dialogue function. In the present embodiment, the controller 190 executes a first dialogue program when the size of the driving load is larger than the predetermined standard and executes a second dialogue program different from the first dialogue program when the size of the driving load is less than the predetermined standard. In this embodiment, each dialogue program is stored in the ROM or a database (not shown) in advance, and the controller 190 selects and executes the dialogue program corresponding to the size of the driving load from the ROM or database by the dialogue function. A first dialogue mode is realized by executing the first dialogue program, and A second dialogue mode is realized by executing the second dialogue program. In the first dialogue program and the second dialogue program, a technique known at the time of filing of the present application can be used to generate voice.

Each dialogue program is composed of a program for recognizing a voice of the occupant and a program for outputting a voice to the occupant. The controller 190 outputs a voice via the speaker 180 and performs speaking to the occupant, by executing the program for outputting a voice. In addition, the controller 190 recognizes a voice of the occupant input via the interior microphone 170 by executing the program for recognizing the voice. The controller 190 executes a dialogue with the occupant by repeating the output a voice and the recognition of the voice of the occupant.

Figure 3:
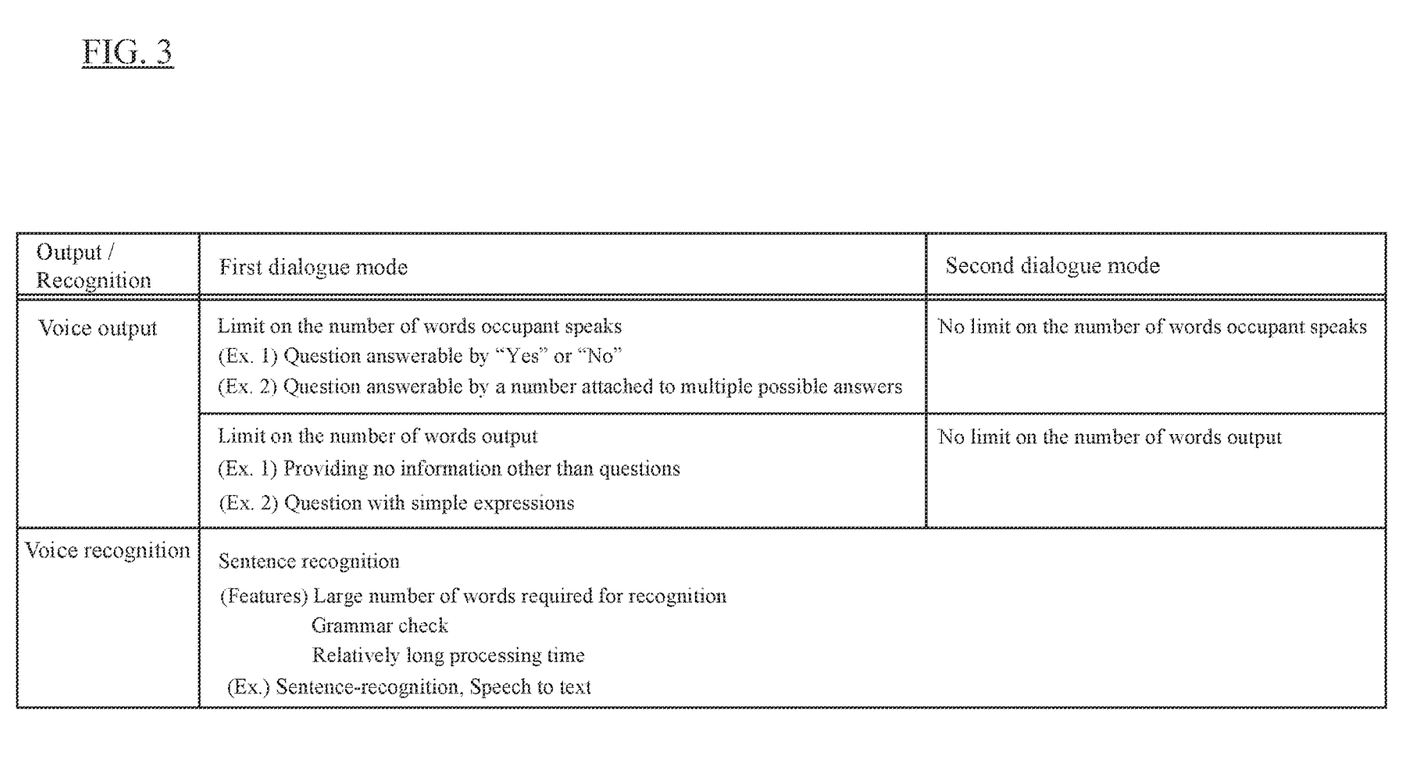
FIG. 3 is a diagram for explaining a first dialogue mode and a second dialogue mode in the first embodiment.

Each dialogue mode will be described hereafter, using FIG. 3 as appropriate. FIG. 3 is a diagram for explaining the first dialogue mode and the second dialogue mode in the present embodiment.

The first dialogue program is programmed to include fewer words in the occupant's answer than the second dialogue program. An "answer" means to a response to a question or call out (hereinafter referred to as a question, etc.) from the controller 190. The occupant's answers include not only answers to one question, etc., but also all the answers provided between the start and the end of the dialogue. Methods for reducing the number of words the occupant speaks include, for example, a method for reducing the number of times the occupant answers, a method for reducing the number of words the occupant speaks per answer, and a method for shortening the words the occupant speaks itself.

Further, the first dialogue program is programmed to output few words via the speaker 180 than the second dialogue program. Methods for reducing the number of words being output include, for example, a method for asking questions or calling out without adding unnecessary information or using simple expressions.

The first dialogue program will be described hereinafter, using the specific example of a case where the controller 190 asks a question to the occupant. The first dialogue program can be applied not only to asking questions, but also to all the actions included in "speaking". For example, the first dialogue program can be also applied to a case of calling out, notifying, or explaining, etc.

For example, the controller 190 asks a question to which the occupant answers selectively "Yes" or "No". For example, in a situation where the destination of the vehicle 100 needs to be settled, the controller 190 asks a question "Your destination is XX, right?" to the occupant. Then, for example, when the controller 190 recognizes a voice "Yes" as the occupant's answer, then the controller 190 accesses the navigation device 130 and sets the destination of the vehicle 100 to XX. For example, when the controller 190 recognizes a voice "No" as the occupant's answer, then the controller asks a question "Is your destination YY?" to the occupant again. The processing after recognizing the occupant's answer is not limited in the present embodiment.

In addition, for example, the controller 190 asks a question to which the occupant selectively answers the number attached to the possible answer. Using the above-mentioned situation in which the destination is settled, for example, the controller 190 asks a question "Which is your destination, 1. XX, 2. YY, or 3. ZZ?" to which the occupant answers with a number from 1 to 3. For example, when the controller 190 recognizes a voice "1" as the occupant's answer, then the controller 190 accesses the navigation device 130 and sets the destination of the vehicle 100 to XX. Although the explanation is based on the case where the number of possible answers is three, the number of possible answers is not particularly limited.

In this way, the number of words the occupant speaks per answer in a dialogue can be reduced by asking a question that allows the occupant to answer selectively. In addition, the number of characters included in a word spoken by the occupant can be shortened. This allows the occupant to dialogue with the system while keeping his or her concentration on driving, even in a situation where the driving load on the occupant is large.

In addition, for example, the controller 190 only asks a question using simple expressions and not adding unnecessary information, as "Your destination is XX, right?". This allows the occupant to more easily hear the question from the controller 190 and easily understand what is being asked. As a result, it is possible to prevent re-asking the question to the occupant who did not understand what was being asked. In a situation where the driving load is large, it is possible to reduce the number of exchanges between the occupant and the system as much as possible, thus reducing the number of times the occupant has to answer.

On the other hand, as shown in FIG. 3, there is no limit on the number of words included in the occupant's answer with respect to voice output in the second dialogue program according to the present embodiment. In addition, there is no limit to the number of words output via the speaker 180 in the second dialogue program. For these reasons, the controller 190 provides detailed and ancillary information to the occupant when executing a dialogue with the occupant by utilizing the second dialogue program.

The second dialogue program will be described using the above situation of settling on a destination as an example. For example, the controller 190 not only asks a question to the occupant, but also provides ancillary information. "Since the weather is clear today, the recommended destinations are XX, YY, and ZZ, where would you like to go? Also, it appears that an AA event is starting this afternoon in this surrounding area today." In the example above, ancillary information includes weather information, recommended destination information, and information about the event. A technique for dialogue programs known at the time of filing this application can be used as appropriate for the second dialogue program.

Further, as shown in FIG. 3, the so-called sentence recognition technique is used for the voice recognition in the first dialogue program and the voice recognition in the second dialogue program. The sentence recognition techniques include, for example, "Sentence-recognition" and "Speech to text". The sentence recognition means to recognize the occupant's voice in a unit of a sentence.

With reference to FIG. 3, the features of sentence recognition will be described. In the sentence recognition, the number of words required to recognize what the occupant has spoken is relatively large. In addition, in the sentence recognition, what the occupant has spoken is understood by recognizing the occupant's voice in a unit of a sentence, so the grammar is checked. Therefore, in the present embodiment, the processing time for the controller 190 to understand what the occupant has spoken is relatively long for both the first dialogue program and the second dialogue program.

Figure 4:
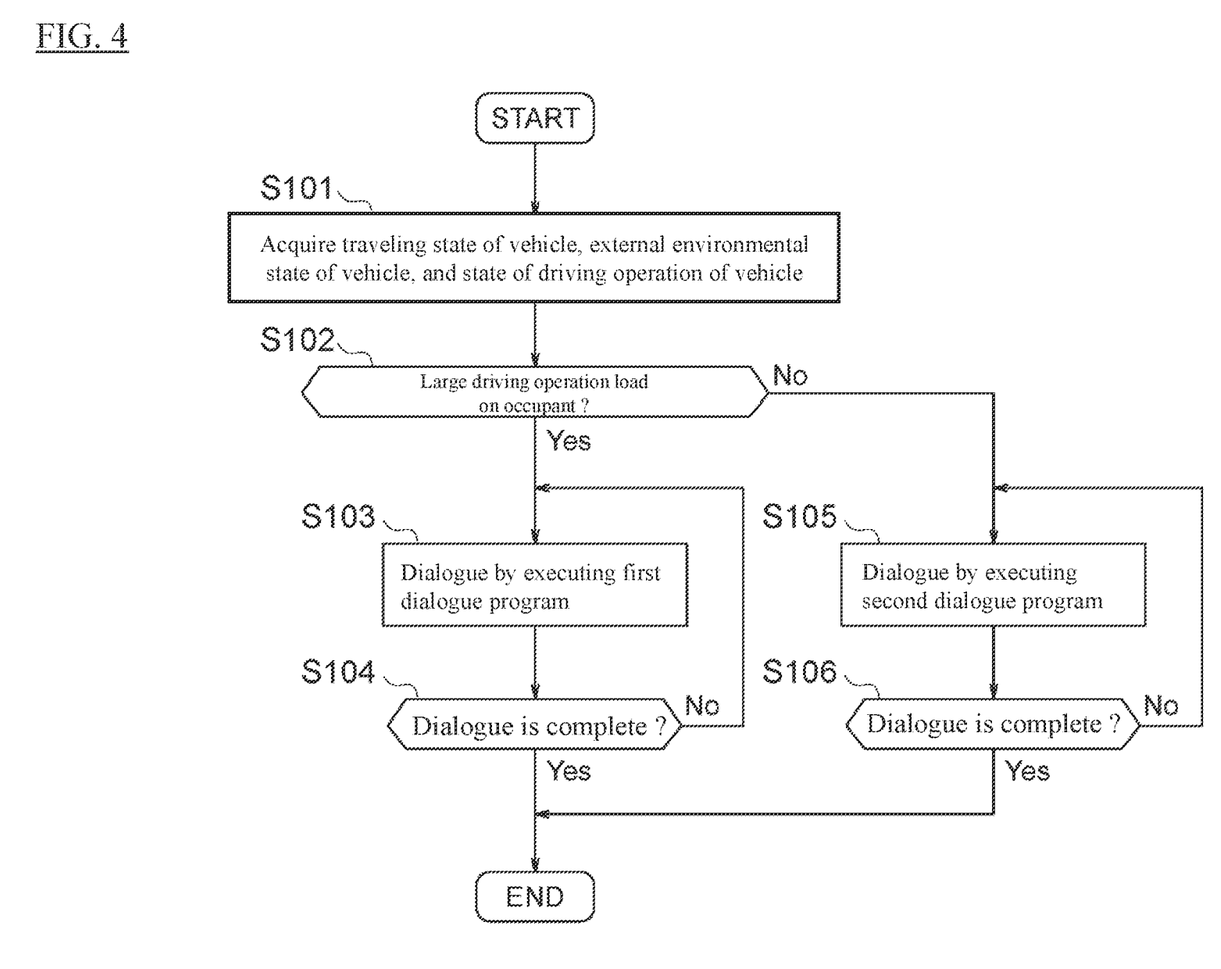
FIG. 4 is a flowchart showing process executed by the controller according to the present embodiment.

Next, using FIG. 4, the process executed by the controller 190 will be described. FIG. 4 is a flowchart showing process executed by the controller 190 according to the present embodiment.

In step S101, the controller 190 acquires information about the traveling state of the vehicle 100, the state of the external environment of the vehicle 100, and the state of the driving operation of the vehicle 100. For example, the controller 190 acquires information on the shift lever position from the shift lever sensor 116 as information on the traveling state. Further, for example, the controller 190 acquires surrounding information of the vehicle 100 from the surrounding detection device 120 as the information on the external environment. Also, for example, the controller 190 executes image processing for the captured image of the driver in the vehicle 100 imaged by the interior camera 160. The controller 190 grasps the driver's driving posture through image processing and acquires information on the driving operation.

In step S102, the controller 190 determines the size of the driving load on the occupant in the vehicle 100 based on the information acquired in step S101. For example, the controller 190 determines that the driving load is large when the vehicle 100 is traveling and determines that the driving load is small when the vehicle 100 is stopping. In addition, for example, the controller 190 determines that the driving load is large when the vehicle 100 is traveling on the highway and determines that the driving load is small when the vehicle 100 is traveling the congested road. For example, the controller 190 determines that the driving load is large when the driver is performing a driving operation for parking in a garage. When it is determined that the driving load is large, proceed to step S103. On the other hand, when it is determined that the driving load is small, proceed to step S105. The above-mentioned determination method is an example and is not particularly limited.

In step S103, the controller 190 executes a dialogue with the occupant by executing the first dialogue program. The controller 190 executes the first dialogue program, for example, to ask a question that can be answered by the occupant with "Yes" or "No". The controller 190 also asks a question, for example, using simple expressions.

Figure 5:
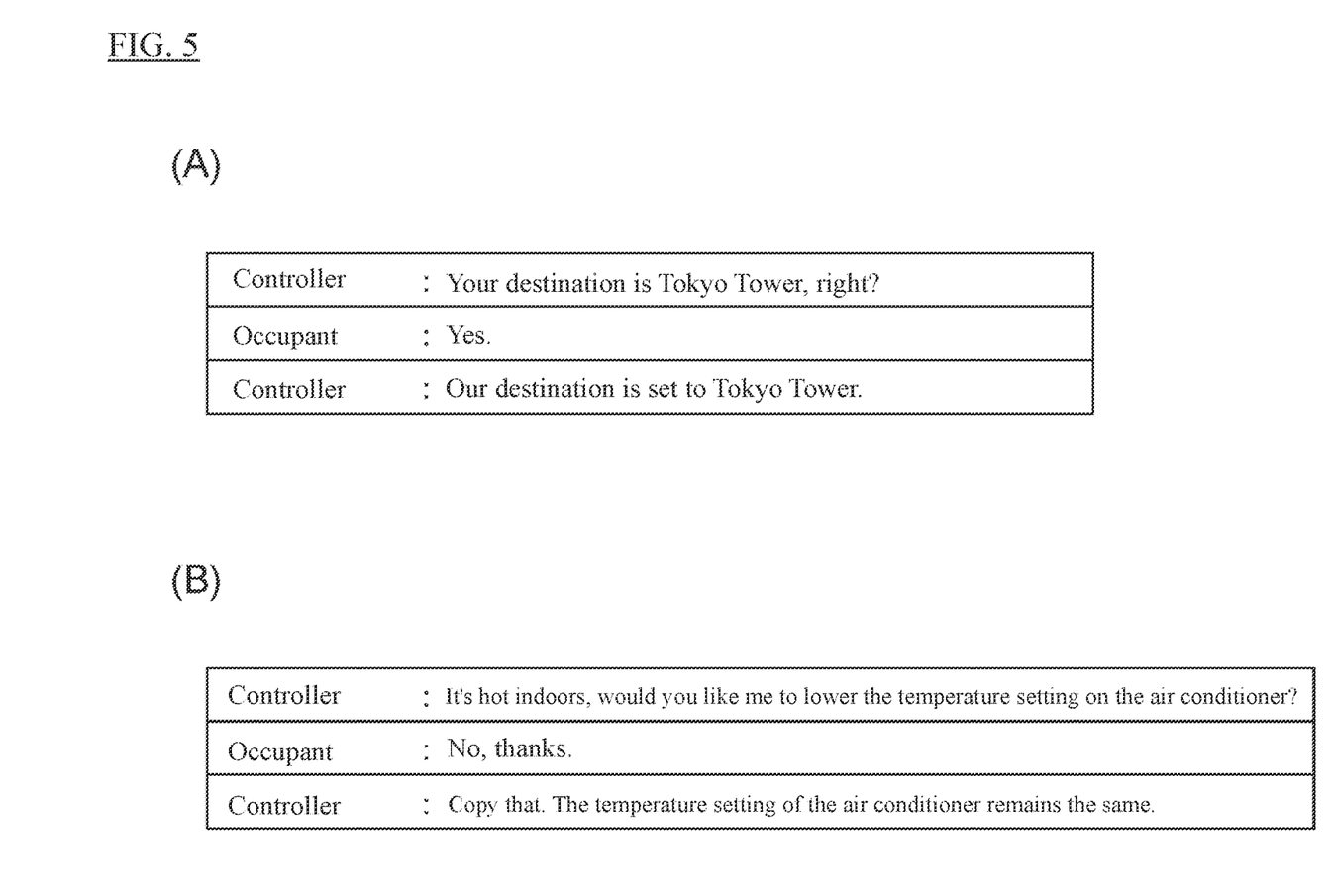
FIG. 5 is an example of a dialogue performed when a first dialogue program is executed.

FIG. 5 is an example of a dialogue performed when the first dialogue program is executed. FIG. 5(A) shows an example of a dialogue in a situation where in the vehicle 100 stopped for a traffic light, the occupant is operating the navigation device 130 to set the destination, but the traffic light has changed and the vehicle 100 starts. FIG. 5(B) is an example of a dialogue in a situation where the interior temperature of the vehicle 100 rises while the occupant is driving on the highway. As shown in FIGS. 5(A) and 5(B), by executing the first dialogue program, the occupant can answer a question from the controller 190 using simple and short words, such as "Yes" or "No, thanks".

In step S104, the controller 190 determines whether or not the dialogue with the occupant in step S103 is completed. For example, when the conditions for completing a dialogue are predetermined, the controller 190 determines whether or not the dialogue has been completed by determining whether or not these conditions are met. Using the example in FIG. 5(A), the condition for completing the dialogue involves the case where the destination is settled by the occupant's answer. When the dialogue is completed, the process by the controller 190 ends. On the other hand, when the dialogue is not completed, return to step S103.

When it is determined that the driving load is small in step S102, proceed to step S105. In step S105, the controller 190 executes a dialogue by executing the second dialogue program.

Figure 6:
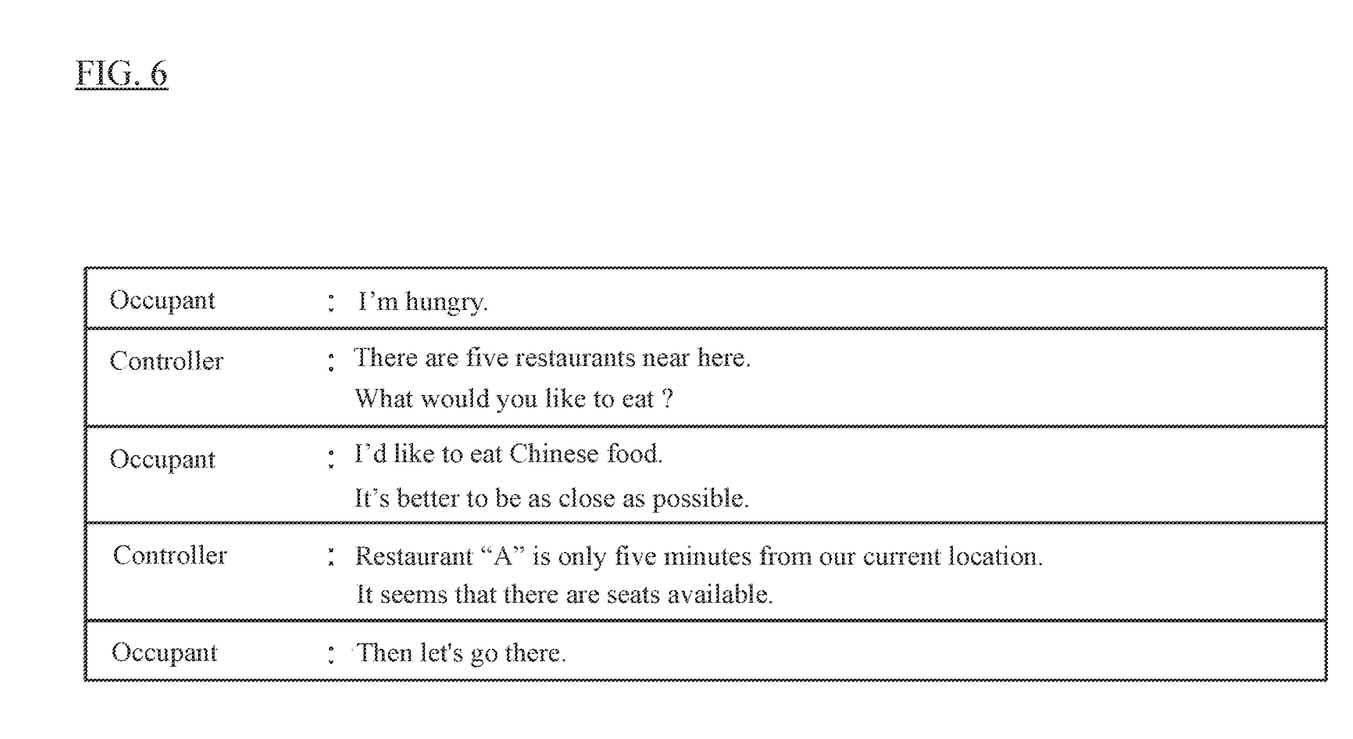
FIG. 6 is an example of a dialogue performed when a second dialogue program is executed.

FIG. 6 is an example of a dialogue performed when a second dialogue program is executed. FIG. 6 shows an example of a dialogue in a situation where the vehicle 100 is parked in a parking lot or the like. As shown in FIG. 6, by executing the second dialogue program, the occupant can designate the food and location with the information provided by the controller 190 (the number of restaurants). In addition, the occupant can decide the restaurant with the information provided by the controller 190 (traveling time to the restaurant, current availability of seats).

In step S106, the controller 190 determines whether or not the dialogue with the occupant in step S105 is completed. Using the example in FIG. 6, the condition for completing the dialogue involves the case where the destination is settled by the occupant's answer. When the dialogue is completed, the process by the controller 190 ends. On the other hand, if the dialogue is not completed, return to step S105.

As described above, the voice dialogue device according to the present embodiment comprises a controller 190 that executes a dialogue with the occupant in the vehicle 100 using the group of sensors 110, the surrounding detection device 120, the navigation device 130, the external information acquisition device 140, the drive device 150, and the interior camera 160, which are equipped with the vehicle 100. The group of sensors 110 detects the traveling state of the vehicle 100. The surrounding detection device 120, the navigation device 130, and the external information acquisition device 140 detect the external environmental state of the vehicle 100. The drive device 150 and the interior camera 160 detect the state of the driving operation by the occupant in the vehicle 100. The controller 190 determines the size of the driving load on the occupant on the basis of at least one of the traveling state of the vehicle 100, the state of the external environment, and the state of the driving operation by the occupant, and executes a dialogue with the occupant by executing the dialogue program corresponding to the size of the driving load. This allows the system to dialogue with the occupant in accordance with the dialogue program corresponding to the size of the driving load, so that the dialogue with the occupant can be continued regardless of the size of the driving load.

In the present embodiment, the controller 190 executes a dialogue with the occupant by executing the first dialogue program when the size of the driving load is larger than the predetermined standard and by executing the second dialogue program different from the first dialogue program when the size of the driving load is smaller than the predetermined standard. In this way, the dialogue with the occupant can be continued by two different dialogue modes corresponding to the size of the driving load.

Further, in the present embodiment, the controller 190 acquires an answer to a question from the occupant by executing the first dialogue program and an answer to a question from the occupant by executing the second dialogue program. The first dialogue program is programmed to include fewer words in the occupant's answer than the second dialogue program. In this way, even when the driving load is large, the occupant can dialogue while keeping concentration on driving.

In addition, in the present embodiment, the controller 190 asks a question to which the occupant answers selectively by executing the first dialogue program. This allows the occupant to dialogue by speaking simple words, for example "Yes" or "No," to a question from the controller 190, even when the driving load is large. In addition, the occupant can dialogue by only speaking the selected result from a plurality of possible answers.

In the present embodiment, the controller 190 determines that the size of the driving load is larger than the predetermined standard when the vehicle 100 is traveling with a drive of the occupant. For example, since the act of driving is a large load for drivers with relatively small driving skill level, such as inexperienced drivers, the size of the driving load can be determined appropriately.

Further, in the present embodiment, the controller 190 determines that the size of the driving load is larger than the predetermined standard when the occupant is performing a driving operation to park. In general, since the driver concentrates on driving operations when parking the vehicle, the size of the driving load can be determined appropriately.

In addition, in the present embodiment, the controller 190 determines that the size of the driving load is larger than the predetermined standard when the vehicle 100 is traveling on a highway or an intersection. In general, since the act of driving on the highway is a large load for the driver, the size of the driving load can be determined appropriately. In addition, since the act of driving at an intersection where there is a possibility that the opposite vehicle will turn right is a large load for the driver, the size of the driving load can be appropriately determined.

Further, in the present embodiment, the controller 190 determines that the size of the driving load is smaller than the predetermined standard when the vehicle 100 is stopping. In general, since the load on the driver is relatively small when the vehicle is stopped, the size of the driving load can be determined appropriately.

In addition, in the present embodiment, the controller 190 determines that the size of the driving load is smaller than the predetermined standard when the vehicle 100 is traveling with an automated drive. Since the load on the driver is relatively small when the driving subject of the vehicle is not the driver, the size of the driving load can be determined appropriately.

Further, in the present embodiment, the controller 190 determines that the size of the driving load is smaller than the predetermined standard when the vehicle 100 is traveling on a congested road or a straight road. In general, since the load on the driver is relatively small in congested situations where the vehicle is traveling at a slow speed or repeatedly stopping and starting, the size of the driving load can be determined appropriately.

In addition, in the present embodiment, the controller 190 selects a dialogue program corresponding to the size of the driving load among the dialogue programs stored in the ROM or database, and executes a dialogue with the occupant via the interior microphone 170 and the speaker 180 by executing the dialogue program. The interior microphone 170 recognizes a voice of the occupant, and the speaker 180 outputs a voice to the occupant. This allows the controller 190 to recognize the voice of the occupant and to ask questions, etc. to the occupant with voice.

Second Embodiment

Next, the voice dialogue device according to the second embodiment will be described. Since the voice dialogue device of the present embodiment has the same configuration as that of the above-mentioned embodiment except that the first dialogue program and the second dialogue program executed by the controller 190 are different, repeated description will be omitted, and the description of the above-mentioned embodiment will be referred to.

Figure 7:
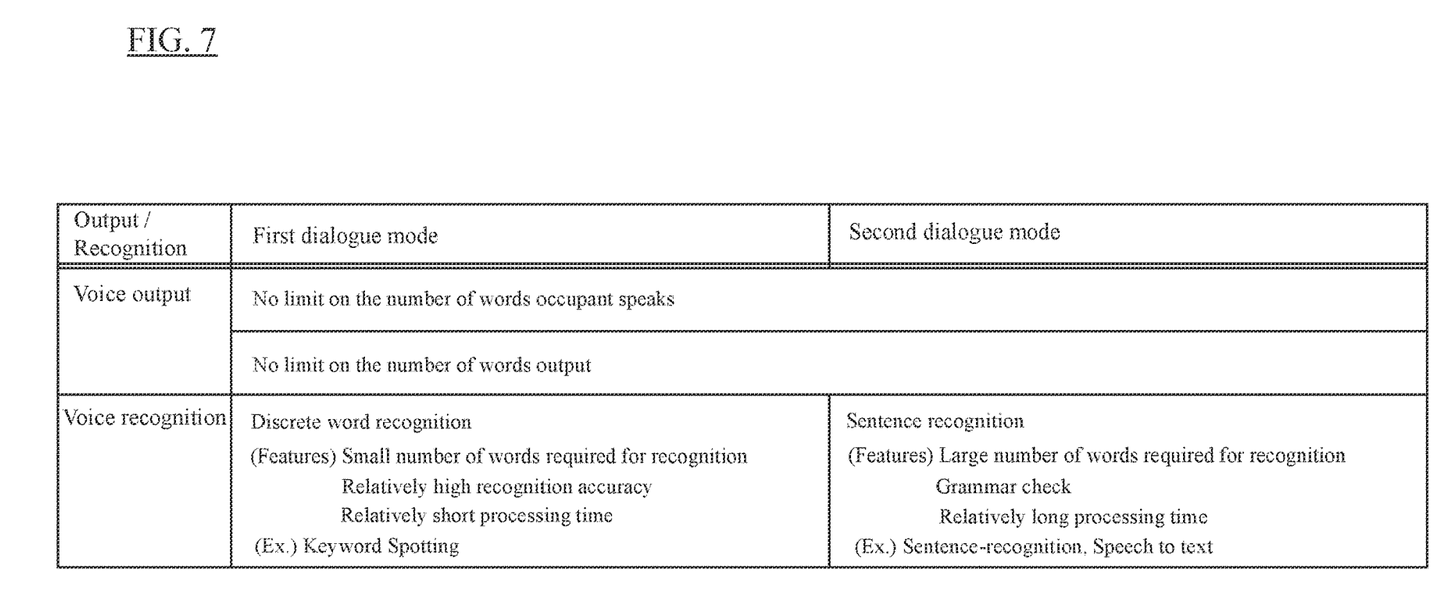
FIG. 7 is a diagram for explaining a first dialogue mode and a second dialogue mode in the second embodiment.

The dialogue program according to the present embodiment will be described with reference to FIG. 7. FIG. 7 is a diagram for explaining a first dialogue mode and a second dialogue mode in the present embodiment.

First, a first dialogue program according to the second embodiment will be described. The first dialogue program according to the present embodiment differs from the first dialogue program according to the first embodiment in terms of voice output and voice recognition. In the present embodiment, the so-called discrete word recognition is used for the voice recognition in the first dialogue program. The discrete word recognition techniques include, for example, "Keyword Spotting". The discrete word recognition means to recognize predetermined word (henceforth referred to "keyword") included in the voice information of the occupant, not to recognize the voice information of the occupant as a sentence.

The features of the discrete word recognition will be described with reference to FIG. 7. In the discrete word recognition, the number of words required to recognize what the occupant has spoken is relatively small. In addition, in the discrete word recognition, what the occupant has spoken is understood by determining whether or not the word corresponds to the keyword, so no grammar is checked. Therefore, the recognition accuracy of the words spoken by the occupant is higher than that of the sentence recognition described above. For example, when the vehicle is traveling on a road with poor road conditions, so-called road noise increases. In this case, the words spoken by the occupant can be recognized with high accuracy by using the discrete word recognition. Also, since there is no grammar check, the processing time for the controller 190 to understand what the occupant has spoken is shorter compared to the sentence recognition described above.

Next, keyword will be described. A keyword is a word registered in a storage device such as the ROM or database in advance. The type of the keywords and the number of characters are not particularly limited. The number of keywords is also not particularly limited, but for high processing speed, the number of keywords is preferable to be in the range of 10 to 20.

Examples of keywords include "Yes", "No", "Front", "Back", "Left", "Right", "Up", "Down", "Strong", "Weak", "High", "Low", or the like. In selecting keywords, it is preferable to consider the relationship with the questions and calls to the occupant. For example, a possible answer to the question "Would you like to lower the temperature of the air conditioner?" could be "Yes", "No", "Lower", or "No, higher", so it is preferable to register the words corresponding to the content of the dialogue as keywords in advance.

In the present embodiment, the voice output of the first dialogue program is used the same as that of the second dialogue program for the first embodiment described above. As shown in FIG. 7, there is no limit to the number of words included in the occupant's answer or the number of words output via the speaker 180 with respect to speech recognition.

On the other hand, as shown in FIG. 7, the second dialogue program according to the present embodiment is the same as the second dialogue program according to the first embodiment. For this reason, repeated descriptions will be omitted and the description of the first embodiment will be referred to.

As described above, in the first dialogue program according to the present embodiment, the technique of the discrete word recognition is used for voice recognition. This allows the system to recognize the words spoken by the occupant with high accuracy even when there is a large road noise, for example when traveling on an unpaved road or a road with a wet surface, and also to reduce the processing time required from the recognition of the occupant's voice to the output of voice.

Third Embodiment

Next, the voice dialogue device according to the third embodiment will be described. Since the voice dialogue device of the present embodiment has the same configuration as that of the above-mentioned embodiments except that the first dialogue program and the second dialogue program executed by the controller 190 are different, repeated description will be omitted, and the description of the above-mentioned embodiment will be referred to.

Figure 8:
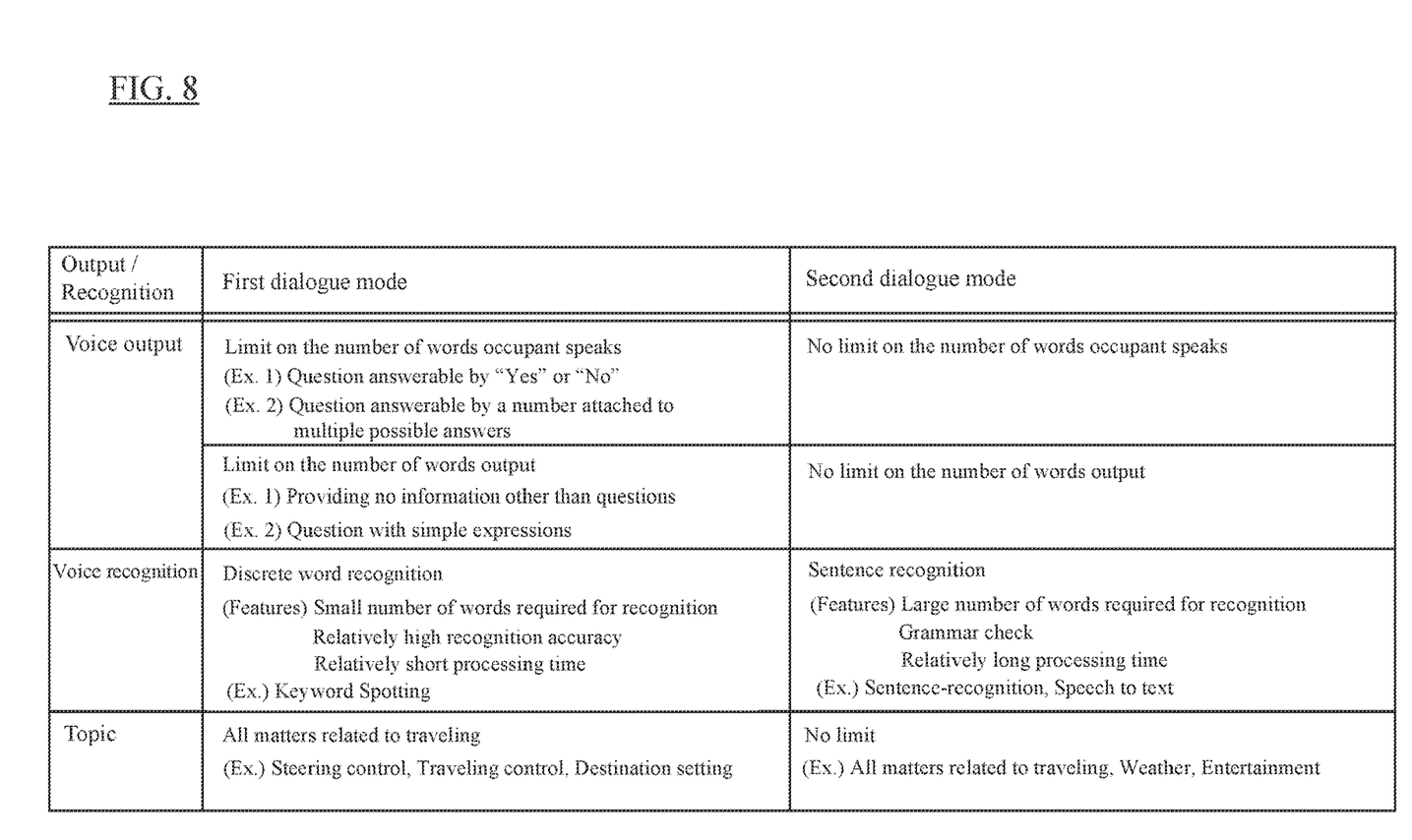
FIG. 8 is a diagram for explaining a first dialogue mode and a second dialogue mode in the third embodiment.

The dialogue program according to the present embodiment will be described with reference to FIG. 8. FIG. 8 is a diagram for explaining a first dialogue mode and a second dialogue mode in the present embodiment. In the present embodiment, since the second dialogue program is the same as the second dialogue program according to the second embodiment, repeated descriptions will be omitted and the description of the above-mentioned embodiment will be referred to.

The first dialogue program according to the third embodiment will be described. The first dialogue program according to this embodiment is composed of the first dialogue program according to the first embodiment with respect to voice output, and the second dialogue program according to the second embodiment with respect to voice recognition. In the present embodiment, the controller 190 asks a question etc. to which the occupant answers with a specific keyword. A specific keyword is a keyword used in the discrete word recognition.

For example, suppose that "Yes" and "No" are registered in the storage device in advance as keywords used in the discrete word recognition. In this case, the controller 190 asks a question, etc., to which the occupant needs to answer with "Yes" or "No". For example, suppose that "Hot" and "Cold" are registered in the storage device in advance as keywords used in the discrete word recognition. In this case, the controller 190 asks a question, for example, about the interior temperature to which the occupant needs to answer with "Hot" or "Cold". For example, suppose that "Good", "Normal", and "Bad" are registered in the storage device in advance as keywords used in the discrete word recognition. In this case, the controller 190 asks a question, etc. to which the occupant needs to select one of the options "Good", "Normal" and "Bad".

In addition, in the present embodiment, a topic handled by the first dialogue program is different from a topic handled by the second dialogue program. Specifically, the first dialogue program is programmed to execute a dialogue with the occupant on matters related to traveling. Matters related to traveling include, for example, steering control, driving control, and destination setting. On the other hand, there is no limit to the topic of dialogue with the occupant in the second dialogue program. Topics handled by the second dialogue program include, for example, weather, entertainment, and other topics unrelated to traveling.

As described above, in the present embodiment, the controller 190 asks a question to which the occupant answers with a keyword registered in advance by executing the first dialogue program. This allows the occupant to dialogue with the system while keeping his or her concentration on driving, even in a situation where the driving load on the occupant is large. In addition, the processing time required to recognize the occupant's voice can be reduced by using discrete word recognition, thus reducing the time required to complete the dialogue.

Further, in the present embodiment, the first dialogue program is programmed to execute a dialogue with the occupant on a topic related to a traveling of the vehicle. This allows the system to ask a question, for example, about steering or notify about vehicle speed, using simple sentences with expressions that are easily understood by the occupant, even in a situation where the driving load on the occupant is large.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the above-mentioned embodiments, a configuration in which the voice dialogue system is equipped in the vehicle 100 has been described as an example. However, the voice dialogue system need not be configured only with the vehicle 100 but may also be configured with the vehicle 100 and a server that can communicate with the vehicle 100. For example, the voice dialogue system may include a server which has the same functions as the controller 190 and communicates with the vehicle to execute a dialogue with the occupant in the vehicle.

In this case, the server exchanges information on the traveling state, information on the state of the external environment, information on the state of driving operation, and voice information via a communication device (not shown). For example, when a vehicle has the configuration shown in FIG. 1 except for the controller 190, the server sequentially acquires information necessary to determine the size of the driving load from the vehicle via the communication device, and also transmits to the vehicle voice information generated by using the dialogue program corresponding to the size of the driving load. On the vehicle side, an in-vehicle communication device (not shown) transmits voice information of the occupant acquired by the interior microphone 170 to the server, and also receives the voice information transmitted from the server and outputs it from the speaker 180.

In this way, the configuration of the voice dialogue system including the server enables, for example, the data center with the server to collectively manage the history of dialogue conducted with a plurality of vehicles. Then, for example, it is possible to generate standards for determining the size of the driving load in accordance with the driving characteristics of the occupant by analyzing the history of the dialogue for each occupant.

Further, for example, in the above-mentioned embodiments, in determining the size of the driving load, an example of determining that the driving load is large when the driving subject of the vehicle corresponds to "Driver" has been described, but in the case of a vehicle with driving support functions, this example is not limited. For example, even if the driving subject corresponds to "Driver," it may be determined that the driving load is small when the driver is receiving driving assistance from the vehicle controller or travel control.

In the above-mentioned embodiments, an example of determining the state of the driving load on the driver has been described, but the present invention can also be applied to a dialogue system for occupant in the vehicle who is not the driver. Specifically, it may determine the state of a load on the occupant in the vehicle who is not the driver and execute the first dialogue program described above when the state of the load on the occupant is large, and execute the second dialogue program described above when the state of the load on the occupant is small. The state of the load on the occupant in the vehicle who is not the driver is determined on the basis of at least one of the following information: information on the traveling state acquired by the traveling state information acquisition function, information on the external environment acquired by the external environment information acquisition function, information on the usage state of a infotainment system (not shown) in the vehicle 100, and information on the usage state of a mobile device (not shown) used by the occupant. For example, when the information on the usage state of the infotainment system (not shown) in the vehicle 100 indicates that video is playing in the infotainment system, the state of the load on the occupant is determined as large. When the information on the usage state of the mobile device used by the occupant indicates that the mobile device used by the occupant is operated by the occupant, the state of the load on the occupant is determined as large and the first dialogue program is executed to dialogue with the occupant. On the other hand, when the information on the usage state of the infotainment system or the like in the vehicle 100 indicates that the infotainment system is not being used, or when the information on the usage state of the mobile device used by the occupant indicates that the mobile device is not operated by the occupant, the state of the load on the occupant is determined as small, and the second dialogue program is executed to dialogue with the occupant. Therefore, depending on whether the in-vehicle device or mobile device is being used, the first dialogue program or the second dialogue program will be selected to dialogue with the occupant. In other words, in the present embodiment, the first dialogue program is executed when it is determined that the driver or the occupant other than the driver is performing some task that requires concentration, and the second dialogue program is executed when it is determined that the driver or the occupant other than the driver is not performing any task that requires concentration.

Further, for example, in this description, the controller 190 has been described as an example of a controller according to the present invention, but the present invention is not limited thereto. In addition, for example the group of sensors 110, the surrounding detection device 120, the navigation device 130, the external information acquisition device 140, and the drive device 150 have been described as an example of a sensor according to the present invention, but the present invention is not limited thereto. Further, for example, the ROM or database has been described as an example of a storage device according to the present invention, but the present invention is not limited thereto. In addition, for example, the interior microphone 170 and the speaker 180 have been described as an example of a voice device according to the present invention, but the present invention is not limited thereto.

DESCRIPTION OF REFERENCE NUMERALS

100 . . . Vehicle
  110 . . . Group of sensors
    111 . . . Vehicle speed sensor
    112 . . . Engine rotation speed sensor
    113 . . . Accelerator opening degree sensor
    114 . . . Brake opening degree sensor
    115 . . . Steering angle sensor
    116 . . . Shift lever sensor
  120 . . . Surrounding detection device
    121 . . . In-vehicle camera
    122 . . . Radar
  130 . . . Navigation device
    131 . . . GPS
  140 . . . External information acquisition device
  150 . . . Drive device
  160 . . . Interior camera
  170 . . . Interior microphone

The invention claimed is:

1. A voice dialogue device comprising:
a controller configured to execute a dialogue with an occupant in a vehicle using at least one sensor equipped in the vehicle, wherein
the at least one sensor detects at least one of a traveling state of the vehicle, an external environmental state of the vehicle, and a state of the occupant, and
the controller is configured to:
  determine, on the basis of the detection result, a state of a load on the occupant; and
  execute a dialogue with the occupant by executing a first dialogue program when the size of the load is larger than the predetermined standard, and executing a second dialogue program different from the first dialogue program when the size of the load is smaller than the predetermined standard,
  wherein the first dialogue program is programmed to ask questions for which the expected occupant's answers include fewer words than with the second dialogue program,
  wherein the first dialogue program uses discrete word recognition to acquire an answer to a question from the occupant, discrete word recognition recognizing one or more predetermined words in voice information of the occupant,
  wherein the second dialogue program uses sentence recognition to acquire an answer to a question from the occupant, sentence recognition recognizing voice information of the occupant in a unit of a sentence.

2. The voice dialogue device according to claim 1, wherein
the controller is configured to ask a question to which the occupant answers with a predetermined word by executing the first dialogue program.

3. The voice dialogue device according to claim 1, wherein
the controller is configured to ask a question to which the occupant answers selectively by executing the first dialogue program.

4. The voice dialogue device according to claim 1, wherein
the controller is configured to determine, on the basis of the detection result, that the size of the load is larger than the predetermined standard when detecting that the occupant is performing driving operations to park the vehicle or that the vehicle is traveling on a highway or an intersection.

5. The voice dialogue device according to claim 1, wherein
the controller is configured to determine, on the basis of the detection result, that the size of the load is larger than the predetermined standard when detecting that the occupant is using an in-vehicle device of the vehicle or a mobile device.

6. The voice dialogue device according to claim 1, wherein
the controller is configured to determine, on the basis of the detection result, that the size of the load is smaller than the predetermined standard when detecting that the vehicle is stopping.

7. The voice dialogue device according to claim 1, wherein
the controller is configured to determine, on the basis of the detection result, that the size of the load is smaller than the predetermined standard when detecting that the vehicle is traveling with an automated drive.

8. The voice dialogue device according to claim 1, wherein
the controller is configured to determine, on the basis of the detection result, that the size of the load is smaller than the predetermined standard when detecting that the vehicle is traveling on a congested road or a straight road.

9. The voice dialogue device according to claim 1, wherein
the first dialogue program is a program to realize a function to dialogue with the occupant on a topic related to a traveling of the vehicle.

10. The voice dialogue device according to claim 1, wherein
the controller is configured to:
select a dialogue program corresponding to the size of the load among dialogue programs stored in a storage device; and
execute a dialogue with the occupant via one or more voice devices by executing the dialogue program, and
the one or more voice devices is configured to recognize a voice of the occupant and output a voice to the occupant.

11. A voice dialogue system comprising:
a server configured to execute a dialogue with an occupant in a vehicle by communicating with the vehicle, wherein
the vehicle is equipped with at least one sensor and one or more voice devices,
the at least one sensor detects at least one of a traveling state of the vehicle, an external environmental state of the vehicle, and a state of the occupant,
the one or more voice devices recognize a voice of the occupant and output a voice to the occupant, and
the server is further configured to:
acquire a detection result of the sensor,
determine, on the basis of the detection result, a state of a load on the occupant; and
execute a dialogue with the occupant by executing a first dialogue program when the size of the load is larger than the predetermined standard, and executing a second dialogue program different from the first dialogue program when the size of the load is smaller than the predetermined standard,
wherein the first dialogue program is programmed to ask questions for which the expected occupant's answers include fewer words than with the second dialogue program,
wherein the first dialogue program uses discrete word recognition to acquire an answer to a question from the occupant, discrete word recognition recognizing one or more predetermined words in voice information of the occupant,
wherein the second dialogue program uses sentence recognition to acquire an answer to a question from the occupant, sentence recognition recognizing voice information of the occupant in a unit of a sentence.

12. A method for controlling a voice dialogue device comprising a controller configured to execute a dialogue with an occupant in a vehicle using at least one sensor equipped in the vehicle, the method comprising:
by the at least one sensor, detecting at least one of a traveling state of the vehicle, an external environmental state of the vehicle, and a state of the occupant;
by the controller, determining, on the basis of the detection result, a state of a load on the occupant; and
executing a dialogue with the occupant by executing a first dialogue program when the size of the load is larger than the predetermined standard, and executing a second dialogue program different from the first dialogue program when the size of the load is smaller than the predetermined standard,
wherein the first dialogue program is programmed to ask questions for which the expected occupant's answers include fewer words than with the second dialogue program,
wherein the first dialogue program uses discrete word recognition to acquire an answer to a question from the occupant, discrete word recognition recognizing one or more predetermined words in voice information of the occupant,
wherein the second dialogue program uses sentence recognition to acquire an answer to a question from the occupant, sentence recognition recognizing voice information of the occupant in a unit of a sentence.

* * * * *